L. M. LAWLESS.

Improvement in Weather-Strips.

No. 4,893. Reissued May 7, 1872.

Witnesses.

H. Carlin Clark

E. Greenaway

Inventor.

Levi M. Lawless by

Dyer Beadle & Co. attys

AM. PHOTO-LITHOGRAPHIC CO. N.Y. (OSBORNE'S PROCESS.)

UNITED STATES PATENT OFFICE.

LEVI M. LAWLESS, OF GENESEO, ILLINOIS.

IMPROVEMENT IN WEATHER-STRIPS.

Specification forming part of Letters Patent No. 118,730, dated September 5, 1871; reissue No. 4,893, dated May 7, 1872.

*To all whom it may concern:*

Be it known that I, LEVI M. LAWLESS, of Geneseo, in the county of Henry and State of Illinois, have invented certain new and useful Improvements in Weather-Strips for Doors; and do hereby declare that the following is a full, clear, and exact description thereof, reference being had to the accompanying drawing making a part of this specification, in which—

Figure 1:
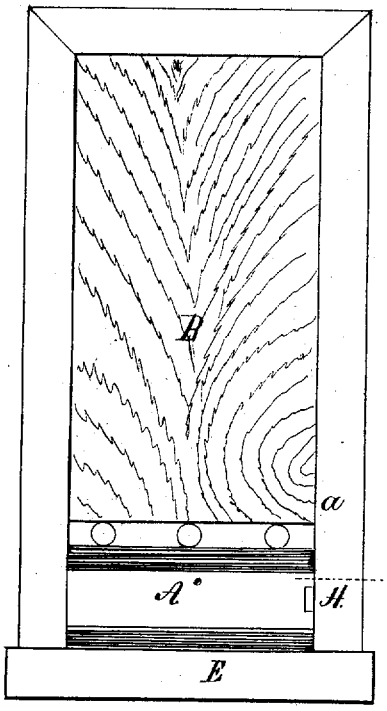
Figure 2:
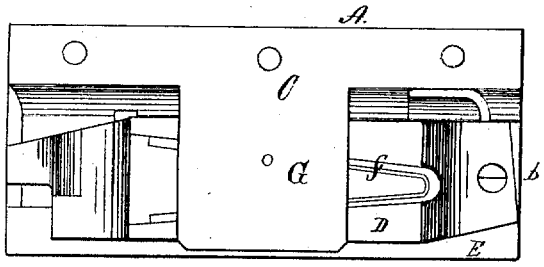
Figure 3:
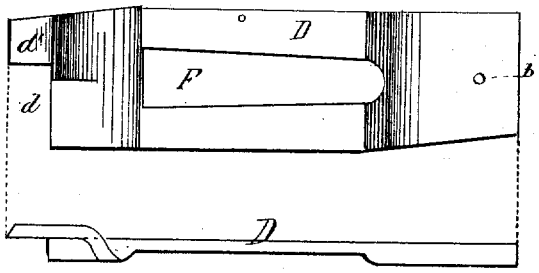
Figure 5:
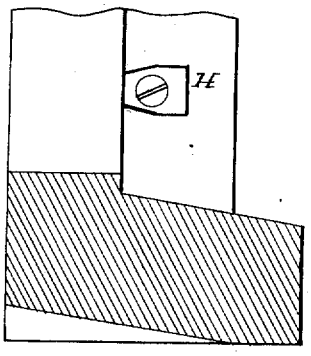
Figure 4:
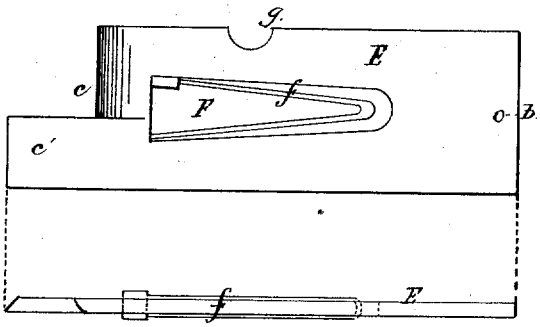

Figure 1 is a front elevation of my device as applied to a door. Fig. 2 is an elevation of the rear side of the same detached. Figs. 3 and 4 are side elevations and edge views, respectively, of the operating-lever and of the slide for closing down upon the door-sill; and Fig. 5 is a horizontal section of the door-post on the line *x x* of Fig. 1.

Letters of like name and kind refer to like parts in each of the figures.

My invention belongs to a class of devices having for its object the closing of the usual opening between the lower end of a door and its sill, so as to prevent the passage of rain, snow, and air through the same; and it consists in the peculiar construction and combination of the operating devices, by means of which the slide is caused to move vertically downward upon or against the door-sill, substantially as and for the purpose hereinafter specified.

In the annexed drawing, A represents the casing of the device, constructed of sheet metal in the form shown in Figs. 1 and 2, and attached to or upon the outer side of the door B at its lower edge, the door-jamb being represented by the letter *a*. The outer portion of said casing extends outward from the face of the door to a sufficient distance to permit the operating devices to be contained between its wall and said door, and from thence extends vertically downward so as to inclose said devices. At its rear side and at its longitudinal center a sectional wall, C, extends vertically downward from and upon a line with the corresponding face of said casing, and forms a housing for and a bearing within which the operating devices are pivoted. D and E represent two flat bars or levers, of metal, which correspond in length and breadth, and are pivoted together at one end, shown by the letter *b*, as seen in Fig. 2. The front lever E has a right-angled notch, *c*, formed within its upper outer corner, with an extended end, *c'*, below it, while the rear lever D has a similar notch, *d*, formed within its outer lower corner, and a corresponding extended end, *d'*, and has the metal immediately nearest to the same offset or bent in, so as to cause said end *d'* to pass into said notch *c* and bring said end *d'* upon the same vertical plane with the end *c'* of the lever E. A wedge-shaped opening, F, formed within each lever, contains a spring, *f*, which bears equally upon each lever so as to hold them in their coincidence, except when purposely pressed together or apart, in which latter event said spring is compressed, and, upon releasing said levers, returns them to their former relative positions. As thus constructed and combined the levers are placed within the casing and connected therewith by means of a screw, G, which passes horizontally through the walls A and C and through said lever D, and forms an axial bearing for the same. A semicircular notch, *g*, cut within the corresponding portion of the lever E, permits the passage of said screw G without its coming into contact with said lever. If, now, the free ends of the levers D and E are pressed apart, the former, rising upward by means of its pivotal connection G, will carry the end of the bar E, which is pivoted at *b*, downward, while the free end of the bar E will be carried downward by the direct pressure until the lower edge of the bar E will rest upon the door-sill, so that, by properly adjusting the relative movements of the free ends of said levers, the lower edge of the bar E will be caused to maintain its horizontal position and impinge upon the door-sill along its entire length at the same instant. A wedge-shaped lug, H, secured upon the door-frame in such position as that, when the door is closed, the end of said lug shall pass between the ends *c'* and *d'*, and the levers thereby be separated, completes the device, the operation of which has already been sufficiently explained.

The especial advantages obtained by this device are, first, the closing-strip is entirely contained within its casing until the door is nearly closed, by reason of which little liability exists of injury to said part while the door is open; second, by being contained within its casing until the door nearly strikes against its jamb *a*, and then moving vertically downward, no possibility exists of the catching of said closing-strip upon the sill in its passage over the same, as is frequently the case in ordinary devices used for a like purpose.

Having thus fully set forth the nature and merits of my invention, what I claim as new is—

1. In a weather-strip, the combination of the levers D and E, constructed substantially as described and shown.

2. The combination of the levers D and E, the spring *f*, and lug H, substantially as described and shown.

In testimony that I claim the foregoing I have hereunto set my hand this 26th day of March, 1872.

LEVI M. LAWLESS.

Witnesses:

GEO. E. WAIT,

SOLON FLEMING.